United States Patent Office 3,178,923
Patented Apr. 20, 1965

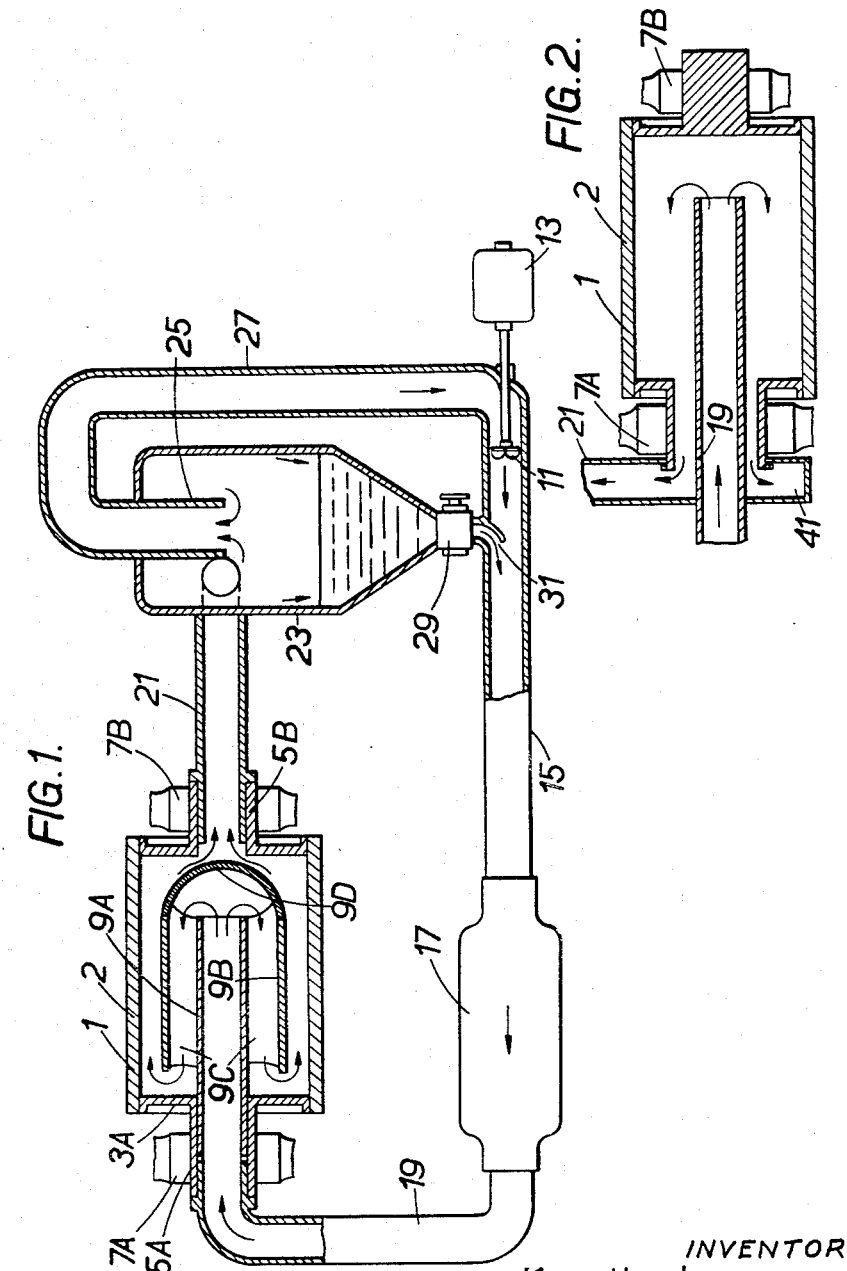

3,178,923
ROLL HEATING MEANS
Kenneth Jones, Middleton, Manchester, and Alastair Ian Blyth Stirling, Lower Walton, Warrington, England, assignors to Associated Electrical Industries Limited, London, England, a British company
Filed Aug. 28, 1962, Ser. No. 219,959
Claims priority, application Great Britain, Sept. 1, 1961, 31,532/61
9 Claims. (Cl. 72—200)

This invention relates to heating means for the hollow cylindrical rolls of rolling mills.

Systems hitherto used for heating such rolls employ either high pressure hot water, or hot oil, as the medium by which heat is transferred from the heat source to the body. Since the hollow roll is rotatable it is necessary to effect a satisfactory seal between the body and adjacent static ducts or pipework through which the heating medium is introduced into, and removed from, the body and this is difficult to achieve.

An object of the present invention is the provision of improved apparatus for heating the hollow cylindrical rolls of rolling mills.

According to the present invention heating means for a hollow cylindrical roll of a rolling mill, comprise fan means arranged to cause a gaseous fluid to flow inside and in heat transfer relationship with the roll, feed means arranged to add inert granular particles, to the gaseous fluid passing towards the roll, heat imparting means arranged to impart heat to the granular particles as they pass towards the roll, and separator means arranged to separate the granular particles from the gaseous fluid after its discharge from the roll and to return separated particles to the feed means.

The invention will now be described, by way of example, with reference to the accompanying diagrammatic drawings, in which:

FIGURE 1 illustrates a heating system for heating a hollow cylindrical roll of a rolling mill; and FIGURE 2 illustrates a modification of the roll shown in FIGURE 1.

The hollow cylindrical roll 1 is of built-up construction and comprises a cylindrical part 2 mounted on two end plates 3A and 3B carrying tubular end parts 5A and 5B respectively, these end parts being mounted in journal bearings 7A and 7B respectively. It will be appreciated that the rolling mill will include other rolls, and will include end frames (not detailed) which carry the bearings 7A and 7B and the bearings of the other rolls. Inside the cylindrical part 2 is fixedly mounted baffle means comprising an inner cylindrical member 9A, an outer cylindrical member 9B mounted on member 9A by radial webs 9C, and a hemispherical cap member 9D mounted on one end of member 9B. Together these parts define a gas flow passage leading from inside the end part 5A axially towards the end part 5B, then axially in the reverse direction as an annular passage, and then axially in the original direction again as an annular passage to the end part 5B.

Means for supplying heat to the roll 1 include a fan 11 driven by an electric motor 13 and arranged in a duct 15. Duct 15 is connected to the inlet of a chamber 17 provided with electrical heating elements (not shown) and through which air from fan 11 can flow into a duct 19 connected at its other end to the end part 5A of the roll 1. This end of duct 19 extends inside the end part 5A with a small annular clearance, and can if desired be provided with air seals acting between the duct and the end part.

An outlet duct 21 extends inside the end part 5B with a small annular clearance, and can if desired be provided with air seals acting between the duct and the end part.

The other end of duct 21 communicates tangentially with the upper part of an upright cylindrical chamber 23 having a central air outlet 25 extending upwardly through its roof and open at its lower end, to form a cyclone separator. The outlet 25 is connected by a duct 27 to the air inlet of the fan 11. The lower end of the chamber 23 is hopper-shaped and is provided with an adjustable discharge valve 29 of any suitable known type, by which granules collected in the hopper bottom of the chamber 23 can be discharged at a desired rate as a steady stream into the duct 15 through a discharge passage 31 curved so that it discharges granules into the duct in the direction taken by air discharged by the fan 11.

In use of the apparatus described above, a suitable charge of granules of glass or alumina having diameters of the order of 0.006 of an inch is first placed in the hopper bottom of the chamber 23, the valve 29 being closed. The fan 11 is then driven by the electric motor 13 to cause a current of air to circulate through the duct 15, the chamber 17, the duct 19, the end part 5A, the sinuous passage in the roll 1, the end part 5B, the duct 21, the upper end of the separator chamber 23, the air outlet 25, the duct 27 and the fan 11. The velocity of the air in the part of this circuit lying between the outlet of fan 11 and the inlet to the separator chamber 23 is of the order of 20 feet per second. The valve 29 is then opened, and a steady stream of granules falls into duct 15 through the discharge passage 31, the granules being entrained and carried on by the air. The electrical heaters in the chamber 17 are energized, and granules are heated as they pass, with the air, through this chamber. The granules pass with the air through the roll 1, and in doing so give up some of their heat to that roll. The air and the granules pass through duct 21 into the chamber 23, where the air passes out upwardly through the outlet 25 while the granules remain in the chamber and settle to the hopper bottom of the chamber.

During close down of the heating means, the valve 29 is first closed and the heating in chamber 17 discontinued, but the fan 11 is allowed to run for a short period in order to ensure that all the granules have been collected in the chamber 23.

It will be noted that the fan 11 is not required to handle air in which are entrained the granules, and this avoids excessive erosion of the blades of the fan and attrition of the granules by the fan blades.

When glass granules are used, the temperature to which the roll 1 can be heated is limited by the need to avoid any thermal softening of the glass granules. However, when alumina granules are used, the operating temperature of the rolls can be raised so high that the limiting factor will normally be the safe operating temperature of the roll. When such high temperatures are used, it may be convenient to omit the duct 27 so that fan 11 handles only cold air, or air preheated somewhat by hot air discharged from the air outlet 25 of the cyclone separator. This considerably reduces the difficulty of designing a suitable fan, although there is a loss of thermal efficiency in the heating operation.

It will be seen that there is no need for any pressure to be built up in the roll 1 apart from that necessary to maintain the desired flow of air and entrained granules, and this considerably simplifies the sealing between the stationary ducts 19 and 21 and the rotating end parts 5A and 5B. Further, since it is impossible for the granules to pass through the seals, only hot air can leak through the seals, and this is comparatively innocuous.

When a closed circuit is used, as shown in FIGURE 1, the air can be replaced with an inert gas and this is advantageous where high temperatures are required for the roll.

In the modified form of roll shown in FIGURE 2, the outer cylindrical baffle 9B is omitted and the air with the entrained granules leaves the roll through an annular passage 41 surrounding the inner end of duct 19 and communicating with the duct 21.

What we claim is:

1. Heating means for a hollow cylindrical roll of a rolling mill comprising:
   (a) flow passages of substantially uniform cross sectional area inside and in heat exchange relationship with the roll;
   (b) fan means arranged to cause a gaseous fluid to flow through the passages in the roll;
   (c) feed means arranged to add inert granular particles to the gaseous fluid passing towards the roll passages;
   (d) heat imparting means arranged to impart heat to the granular particles as they pass towards the roll; and
   (e) separator means arranged to separate the granular particles from the gaseous fluid after its discharge from the roll, and to return separated particles to the feed means.

2. Heating means as claimed in claim 1, wherein the inert granular particles are of glass.

3. Heating means as claimed in claim 1, wherein the inert granular particles are of alumina.

4. Heating means as claimed in claim 1, wherein baffle means inside the roll are arranged to cause the gaseous fluid to flow alternately in opposite axial directions in the roll.

5. Heating means as claimed in claim 1, wherein the cylindrical roll includes two opposite end parts extending respectively through two journal bearings, one of these end parts is formed with separate first and second axial passages, the gaseous fluid enters the roll axially through the first passage, baffle means inside the roll are arranged to cause the gaseous fluid to flow alternately in opposite axial directions in the roll as it passes from the first passage to the second passage, and the gaseous fluid leaves the roll axially through the second passage.

6. Heating means as claimed in claim 1, wherein the cylindrical roll includes two opposite end parts extending respectively through two journal bearings, the gaseous fluid enters the roll axially through a first of these end parts, baffle means inside the roll are arranged to cause the gaseous fluid to flow alternately in opposite axial directions in the roll as it passes from the first end part to the second end part, and the gaseous fluid leaves the roll axially through the second of the two end parts.

7. Heating means as claimed in claim 1, wherein the separator means are arranged to return separated gaseous fluid to an inlet of the fan means.

8. Heating means as claimed in claim 1, wherein the gaseous fluid is air.

9. Heating means as claimed in claim 1, wherein the heat imparting means is a chamber provided with electrical heating elements and through which the granular particles entrained in the gaseous fluid are caused to flow.

References Cited by the Examiner

UNITED STATES PATENTS

| | | | |
|---|---|---|---|
| 2,890,026 | 6/59 | Marganski et al. | 80—41 |
| 2,908,486 | 10/59 | Thornburg | 80—41 |
| 3,006,609 | 10/61 | Anthony | 165—119 |

WILLIAM J. STEPHENSON, *Primary Examiner.*

CHARLES W. LANHAM, *Examiner.*